US011869326B2

(12) United States Patent
Pole

(10) Patent No.: US 11,869,326 B2
(45) Date of Patent: Jan. 9, 2024

(54) EMBER DETECTOR DEVICE, A BUSH/WILD FIRE DETECTION AND THREAT MANAGEMENT SYSTEM, AND METHODS OF USE OF SAME

(71) Applicant: FIRE S.A. PTY LTD., Ironbank (AU)

(72) Inventor: Graham Pole, Queensland (AU)

(73) Assignee: FIRE S.A. PTY LTD., Ironbank (AU)

( * ) Notice: Subject to any disclaimer, the term of this patent is extended or adjusted under 35 U.S.C. 154(b) by 0 days.

(21) Appl. No.: 17/971,538

(22) Filed: Oct. 21, 2022

(65) Prior Publication Data

US 2023/0162582 A1 May 25, 2023

Related U.S. Application Data

(63) Continuation of application No. 17/424,122, filed as application No. PCT/AU2020/050023 on Jan. 17, 2020, now Pat. No. 11,482,091.

(30) Foreign Application Priority Data

Jan. 17, 2019 (AU) ................................ 2019900136

(51) Int. Cl.

| | |
|---|---|
| ***G08B 17/00*** | (2006.01) |
| ***G08B 17/107*** | (2006.01) |
| ***G08B 17/11*** | (2006.01) |
| ***G08B 17/117*** | (2006.01) |
| ***G08B 17/12*** | (2006.01) |
| ***G08B 25/08*** | (2006.01) |

(52) U.S. Cl.

CPC ......... *G08B 17/005* (2013.01); *G08B 17/107* (2013.01); *G08B 17/11* (2013.01); *G08B 17/117* (2013.01); *G08B 17/12* (2013.01); *G08B 25/08* (2013.01)

(58) Field of Classification Search

CPC .................................................... G08B 17/005

See application file for complete search history.

(56) References Cited

U.S. PATENT DOCUMENTS

| | | | | |
|---|---|---|---|---|
| 4,718,497 | A * | 1/1988 | Moore ................... | G08B 17/12 169/61 |
| 2005/0247883 | A1 * | 11/2005 | Burnette ................... | G01J 1/46 250/372 |
| 2017/0099638 | A1 * | 4/2017 | Kim .................. | H04W 52/0261 |
| 2018/0374330 | A1 * | 12/2018 | Balaji .................. | G08B 29/145 |

* cited by examiner

*Primary Examiner* — Travis R Hunnings

(74) *Attorney, Agent, or Firm* — Rodney J. Fuller; Booth Udall Fuller, PLC

(57) ABSTRACT

Embers created by fires, particularly fires in environments such as grassland, bushland, and forests, can lead to the loss of property and animal and human lives. In addition to the loss of property and lives, fires caused by embers lead to an increase in greenhouse gasses, an increase in the risk associated with an ember attack and/or a fire, and a reduced ability to effectively fight an ember attack and/or a fire. The concept bush/wildfire should be understood to include forest fires, grassland fires, and the like. The present disclosure relates to an ember detector device, a bush/wild fire detection and threat management system, and methods of reducing greenhouse gasses, reducing the risk associated with an ember attack and/or a fire, and enhancing an ability to effectively fight an ember attack and/or a fire.

15 Claims, 4 Drawing Sheets

EMBER DETECTOR DEVICE, A BUSH/WILD FIRE DETECTION AND THREAT MANAGEMENT SYSTEM, AND METHODS OF USE OF SAME

CROSS-REFERENCE TO RELATED APPLICATIONS

This application is a Continuation of U.S. patent application Ser. No. 17/424,122, filed on Jul. 19, 2021 (issued as U.S. Pat. No. 11,482,091), which is the U.S. National Stage of International Patent Application No. PCT/AU2020/050023, filed on Jan. 17, 2020, which claims the benefit of and priority to Australia Patent Application No. 2019900136, filed on Jan. 17, 2019, the contents of each of which are hereby incorporated by reference in their entireties.

FIELD OF INVENTION

The present disclosure relates to an ember detector device, a bush/wild fire detection and threat management system, and methods of reducing greenhouse gasses, reducing the risk associated with an ember attack and/or a fire, and enhancing an ability to effectively fight an ember attack and/or a fire.

BACKGROUND OF INVENTION

Embers created by fires, particularly fires in environments such as grassland, bushland, and forests, can lead to the loss of property and animal and human lives. In addition to the loss of property and lives, fires caused by embers lead to an increase in greenhouse gasses, an increase in the risk associated with an ember attack and/or a fire, and a reduced ability to effectively fight an ember attack and/or a fire. Accordingly, a need exists for an ember detector device, a bush/wild fire detection and threat management system, and methods of reducing greenhouse gasses, reducing the risk associated with an ember attack and/or a fire, and enhancing the ability to effectively fight an ember attack and/or a fire. The concept bush/wildfire should be understood to include forest fires, grassland fires, and the like.

SUMMARY

Environmental fires in Australia, and other countries, cause significant damage to property and structures. In many cases, local fire services are often unable to contain these fires with losses to buildings (barns, houses, sheds, stables, etc.) Regrettably, losses are not limited to property and structures and animal and human lives are often at risk and lost during such fires. In many cases, buildings and/properties catch fire as a result of embers, i.e., wind-borne burning debris, created by an environmental fire. Such embers can land on or near a building or property and set the building or property alight before direct flames and/or radiant heat from the environmental fire arrive. Vast amounts of air pollutants are released from burning buildings or properties, which also damages the environment. Other impacts of building fires include loss of personal belongings and negative impacts to animal and human welfare. Typically, a fire suppression system protects a building from embers, flames, and/or radiant heat by wetting the building and the surrounding area. In effect, embers landing on or near a building are extinguished by the fire suppression system, thus reducing the risk of the building catching alight.

Furthermore, carbon emission, in the form of greenhouse gases, due to fires in natural environments can represent the equivalent of approximately 50% of all fossil fuel burnt per year. Such greenhouse gasses have a deleterious effect on the environment and impact on climate change. Indeed, recent environmental fires in Australia and the United States of America have been shown to produce vast amounts of carbon dioxide per year. In Australia, for example, recent catastrophic environmental fires burned vast amounts of land, destroyed numerous properties, and resulted in a great loss of life, both animal and human. On the other hand, currently environmental fires in the contiguous states of the United States of America produce about 290 million tonnes of carbon dioxide per year, which amounts to approximately 5% of the greenhouse gasses that the United State of America produces by burning fossil fuels. Leading studies have shown that over approximately the last 60 years environmental fires, i.e., forest fires, have contributed the greatest direct impact on carbon emissions with respect to boreal forest biomes, including the forests found in the higher latitudes of Alaska, Canada, and Siberia. In some cases, such large forest fires produce significant pulses of additional carbon emissions. Further carbon emissions contributions are associated with increased decomposition of organic material on the forest floor due to loss of forest canopy cover, i.e., increased sunlight reaching the forest floor. In addition to the greenhouse gasses, particulate carbon in the form of soot, also known as black carbon, contributes as a key driver of man-made climate change.

The present disclosure in one aspect sets forth an ember detector device. Preferably, the device includes: an infrared sensor configured to detect a reflected infrared photon and to generate an infrared sensor output signal; a hygrometer configured to detect ambient humidity and to generate a hygrometer output signal; a 360° cone mirror configured to reflect an incident infrared photon as the reflected infrared photon; a lens configured to focus the reflected infrared photon onto the infrared sensor; and an electronic controller configured to: receive the infrared sensor output signal and the hygrometer output signal; compare the infrared sensor output signal with a predetermined infrared sensor output signal control point value; compare the hygrometer output signal with a predetermined hygrometer output signal control point value; and provide an ember detection alert signal based on each comparison.

The present disclosure in another aspect sets forth a method for reducing greenhouse gasses. The method includes: locating an ember detector device proximal to a combustible material, the ember detector device including: an infrared sensor configured to detect a reflected infrared photon and to generate an infrared sensor output signal; a hygrometer configured to detect ambient humidity and to generate a hygrometer output signal; a 360° cone mirror configured to reflect an incident infrared photon as the reflected infrared photon; a lens configured to focus the reflected infrared photon onto the infrared sensor; and an electronic controller; and configuring the electronic controller to: receive the infrared sensor output signal and the hygrometer output signal; compare the infrared sensor output signal with a predetermined infrared sensor output signal control point value; compare the hygrometer output signal with a predetermined hygrometer output signal control point value; and provide an ember detection alert signal based on each comparison.

As used herein, "configured" includes creating, changing, and/or modifying a program or application on a mobile device, a computer, or a network of computers so that the mobile device, computer, or network of computers behave(s) according to a set of instructions. The programming to accomplish the various embodiments described herein will be apparent to a person of ordinary skill in the art after reviewing the present specification, and for simplicity, is not detailed herein. The program or application may be stored on a computer-readable medium, such as, but not limited to, a non-transitory computer-readable medium (for example, hard disk, RAM, ROM, CD-ROM, DVD, USB memory stick, or other physical device), and/or the Cloud.

The reference to any prior art in this specification is not and should not be taken as an acknowledgement or any form of suggestion that the prior art forms part of the common general knowledge in Australia or in any other country.

It is to be understood that the foregoing general description and the following detailed description are exemplary and explanatory only and are not restrictive of the invention, as claimed, unless otherwise stated. In the present specification and claims, the word "comprising" and its derivatives including "comprises" and "comprise" include each of the stated integers, but does not exclude the inclusion of one or more integers. The claims as filed with this application are hereby incorporated by reference in the description.

The accompanying drawings, which are incorporated in and constitute a part of this specification, illustrate several embodiments and together with the description, serve to explain the principles of one or more forms of the invention.

DETAILED DESCRIPTION

Figure 1:
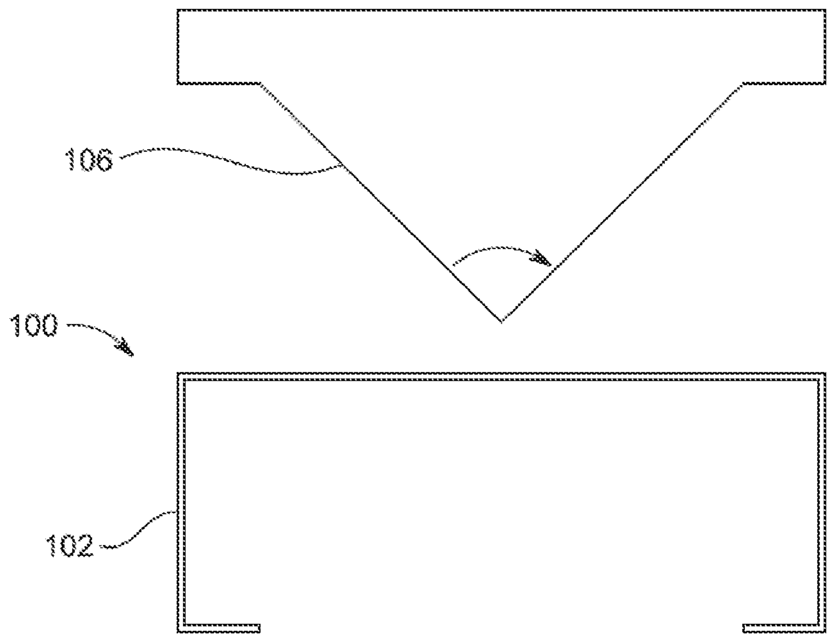
FIG. 1 is cross section of an ember detector device as herein disclosed.

The following detailed description of an embodiments of an ember detector device refer to the accompanying drawings.

FIGS. 1 to 7 illustrate a preferred embodiment of an ember detector device 100. The ember detector device 100 includes an infrared sensor 102, a hygrometer 604, a 360° cone mirror 106, and a lens 208. The infrared sensor 102 and the hygrometer are in electronic communication with an electronic controller 610. The 360° cone mirror 106 is configured to reflect an incident infrared photon 212 as a reflected infrared photon 214 onto the lens 208. The lens 208 is configured to focus the reflected infrared photon 214 onto the infrared sensor 102. The infrared sensor 102 is configured to detect the reflected infrared photon 214 and generate an infrared output signal. The hygrometer 604 is configured to detect ambient humidity and generate a hygrometer output signal. The electronic controller 610 is configured to receive the infrared output signal and the hygrometer output signal. The electronic controller 610 is further configured to compare the infrared sensor output signal with a predetermined infrared output signal control point value, compare the hygrometer output signal with a predetermined hygrometer output signal control point value, and provide an ember detection alert signal based on each comparison. The electronic controller 610 may be configured to provide the ember detection alert signal when both comparisons exceed their respective predetermined control point values and actuate an ember extinguishing system 622. Wherever possible, like numbers refer to like parts, elements, features, and/or steps.

It will be appreciated that the ember device 100 may also detect a fire and, thus, be understood to be able to serve as a fire detector.

The electronic controller may be configured to receive the infrared sensor output signal as a thermal image, apply algorithms to exclude non-ember noise and use adaptive background subtraction to only detect, during day and night condition, embers as appropriately sized, and/or group-flying infrared light emitting objects. The non-ember noise may be an object of a predetermined size or a predetermined size range. The noise may be derived from a dimming object, a falling object, a flying object, and/or a stationary object.

Preferred embodiments of the ember detector device 100 may be configured to determine and provide an ember detection alert signal based on directional absorptance, a directional attenuation coefficient, directional reflectance, directional transmittance, heat flux, a hemispherical attenuation coefficient, hemispherical emissivity, hemispherical reflectance, hemispherical transmittance, irradiance flux density, luminous flux, power, radiance, radiant energy, radiant energy intensity, radiant exitance, radiant exposure, radiant flux, radiant intensity, radiosity, spectral directional absorptance, a spectral directional attenuation coefficient, spectral directional reflectance, spectral directional transmittance, spectral exitance, spectral exposure, spectral flux, spectral flux density, a spectral hemispherical attenuation coefficient, spectral hemispherical emissivity, spectral hemispherical reflectance, spectral hemispherical transmittance, spectral intensity, spectral irradiance, spectral radiance, spectral radiosity, and/or any combination of the aforementioned.

The infrared sensor 102 is a thermopile infrared sensor composed of a set of silicon thermocouples connected in series. Such thermocouples produce a temperature-dependent voltage, i.e., the infrared output signal, as a result of the thermoelectric effect, which is used to generate the infrared sensor output signal. In preferred embodiments, the infrared sensor may be a graphene/silicon photodetector, a photoemission/photoelectric detector, a photovoltaic detector, a polarization detector, a semiconductor detector, or a thermal detector. In further preferred embodiments, the photoemission/photoelectric detector may be a gaseous ionization detector, a microchannel plate detector, a photomultiplier detector, or a phototube detector. Preferably, the semiconductor detector may be a cadmium zinc telluride radiation detector, a charge-coupled device, a mercury zinc telluride detector, a photodiode, a photoresistor, a phototransistor, a quantum dot photoconductor, or an active-pixel sensor. In preferred embodiments, the thermal detector may be a bolometer, a cryogenic detector, a Golay cell, a microbolometer, a pyroelectric detector, or a thermopile. In particularly preferred embodiments, the infrared sensor may be at least a single pixel infrared detector, a cluster of at least four pixel elements, or an imaging array of at least 20,000 pixels. In a particularly preferred embodiment, the infrared sensor 102 is a thermal camera. Preferably, the thermal camera includes a microbolometer.

A person skilled in the art will appreciate that a single pixel infrared detector may represent the simplest and cheapest option, but may be limited in detection range as it would be required to detect across a broad target range, i.e., 360° around the ember detector device 100. A preferred embodiment may include splitting the detection zone into quadrants and using separate single pixel detectors for each quadrant, although it will be appreciated that this approach will increase associated costs. Further preferred embodiments may include a quantum infrared detector that includes an InAs/InAsSb/InSb (Indium Arsenic Actinomide) photovoltaic infrared detector that is capable of detecting wavelengths between 700 nm-1,000,000 nm. In a further preferred embodiment, the infrared detector may be a microbolometer, i.e., an uncooled thermal sensor consisting of an array of pixels, each pixel being made up of several layers. In an alternative embodiment, the infrared detector may be a cooled thermal sensor. A further preferred embodiment may include a thermal imaging camera as the infrared detector, in combination with a 360° cone mirror.

The hygrometer 604 includes a small capacitor (not shown) that includes a hygroscopic dielectric material located between a pair of electrodes. Absorption of moisture by the hygrometer 604 results in an increase in capacitance, which is used to generate the hygrometer output signal. Preferred embodiments may alternatively include a crystal hygrometer, a gravimetric hygrometer, a microwave refractometer, a resistive hygrometer, a thermal hygrometer, or an aluminium oxide hygrometer.

Figure 2:
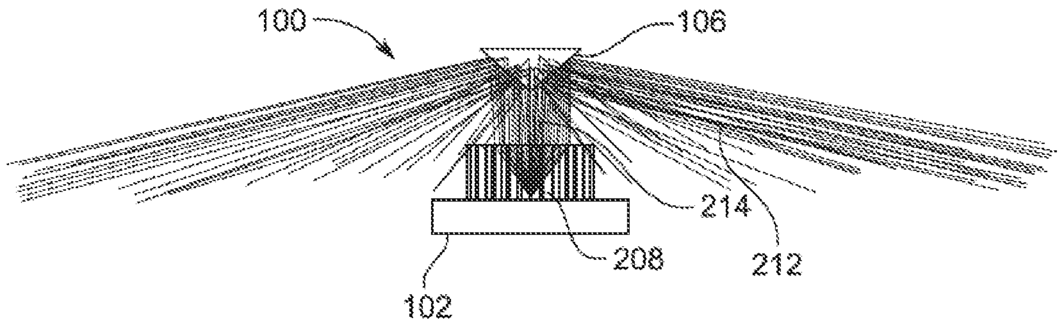
FIG. 2 is a cross section of the ember detector device of FIG. 1 schematically showing incident and reflected infrared light.
Figure 5:
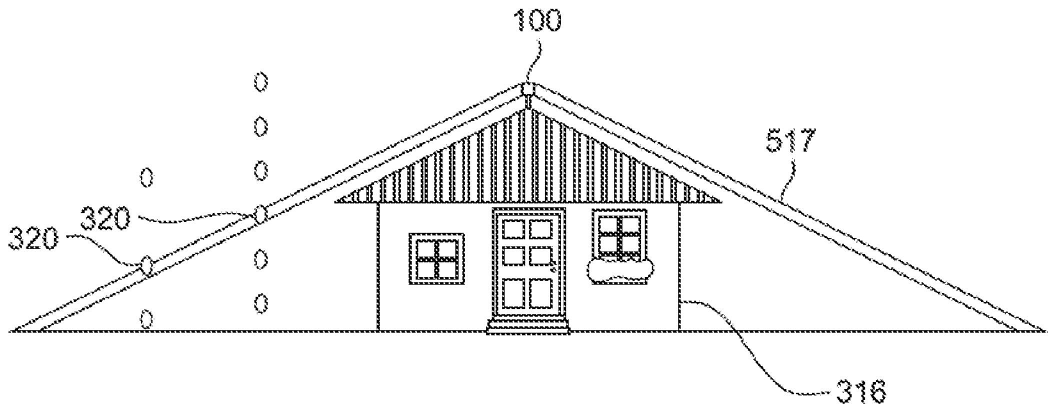
FIG. 5 is a side view of a building having the ember detector device of FIGS. 1 and 2 mounted thereon and schematically showing falling embers.

The 360° cone mirror 106 is configured to capture a “fan” of collimated radiation within a beam-like zone 517 as shown in FIGS. 2 and 5. As a falling ember 320 passes through the beam-like zone 517, i.e., the detection zone, one or more incident infrared photon(s) is/are emitted by the falling ember 320 and reflected by the 360° cone mirror onto the lens 208. It will be appreciated that any suitable material that can reflect infrared light may be used to manufacture the 360° cone mirror. In preferred embodiments, the 360° cone mirror may be machined, 3D printed, or cast out of any such suitable material that can reflect infrared light. A person skilled in the art will appreciate that the reflectivity of the 360° cone mirror 106 may be increased, as appropriate, by the application of an aluminium, silver, or gold coating on the surface thereof. In preferred embodiments, the 360° cone mirror 106 may be a beryllium mirror, a chromium mirror, a copper mirror, a gold mirror, a molybdenum mirror, a platinum mirror, a rhodium mirror, a silver mirror, a tungsten mirror, or an aluminium mirror. Preferably, the 360° cone mirror may be manufactured out of aluminium and polished to a level of reflectivity across thermal wavelengths that will be >90%. Preferably, the 360° cone mirror may be an aluminium mirror, which is fine polished. Further preferably, the 360° cone mirror may be a silver-coated aluminium mirror.

The lens 208 is a germanium lens that is configured to focus a reflected infrared photon 214 that has been reflected by the 360° cone mirror 106 from thermal radiation arising from a falling ember 320 as shown in FIG. 5. It will be appreciated that any optical lens made from a material that can focus infrared light, i.e. electromagnetic radiation with a wavelength in the range of 700 nm-1,000,000 nm may be used. In a particularly preferred embodiment, the wavelength is in the range of 700 nm-14,000 nm.

Preferably, the lens may be a borosilicate crown glass lens, a calcium fluoride lens, a fused silica lens, a germanium lens, a magnesium fluoride lens, a potassium bromide lens, a sapphire lens, a silicon lens, a sodium chloride lens, a zinc selenide lens, or a zinc sulphide lens.

Figure 3:
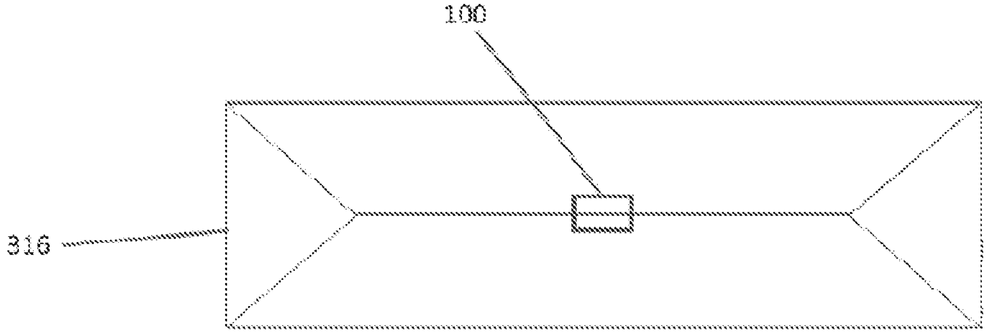
FIG. 3 is a top view of a building having the ember detector device of FIGS. 1 and 2 mounted thereon.
Figure 4:
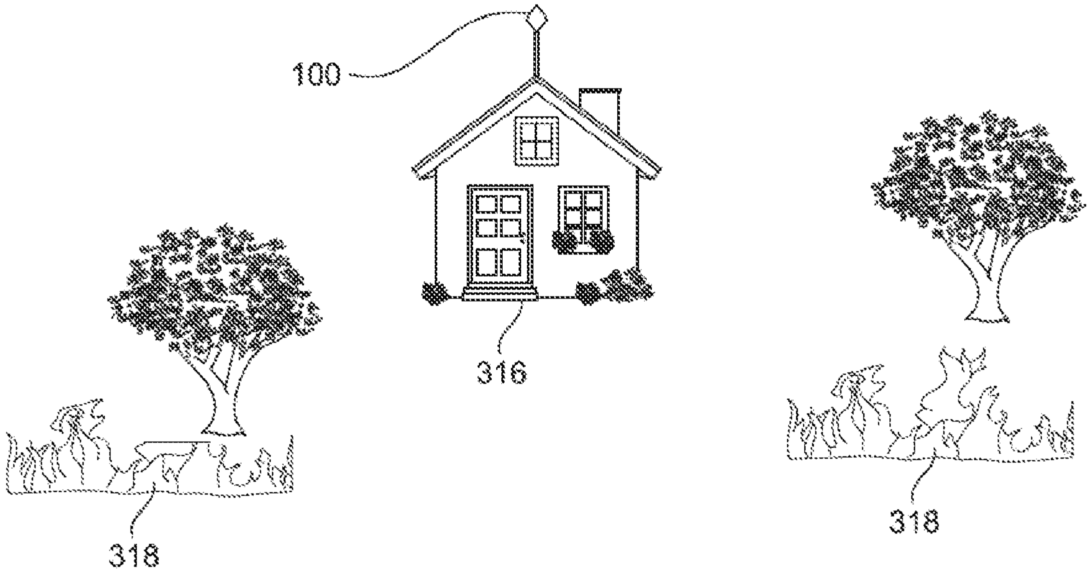
FIG. 4 is a side view of a building having the ember detector device of FIGS. 1 and 2 mounted thereon.

Specifically referring to FIGS. 3 to 5, the ember detector device 100 is mounted to a building 316, which facilitates detection of one or more falling ember(s) 320 that result(s) from one or more fire(s) 318 near the building 316. It will be appreciated by a person skilled in the art that the ember detector 100 may be located adjacent any combustible material with a view to protecting the combustible material from falling embers. Such combustible material may include lumber, timber, forested areas, grassland areas, orchards, etc. Additionally, such combustible material may include buildings and property, for example, barns, stables, dwellings, office blocks, factories, and the like. It will also be appreciated by a person skilled in the art that fires at some distance from a combustible material may form embers that are carried by airflow over such distances and may land on or near the combustible material and thereby represent a risk.

Figure 6:
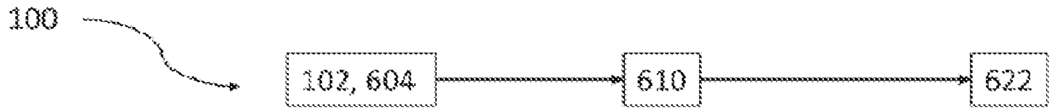
FIG. 6 is a schematic representation of an ember detector device as herein disclosed showing a relationship to an ember extinguishing system.
Figure 7:
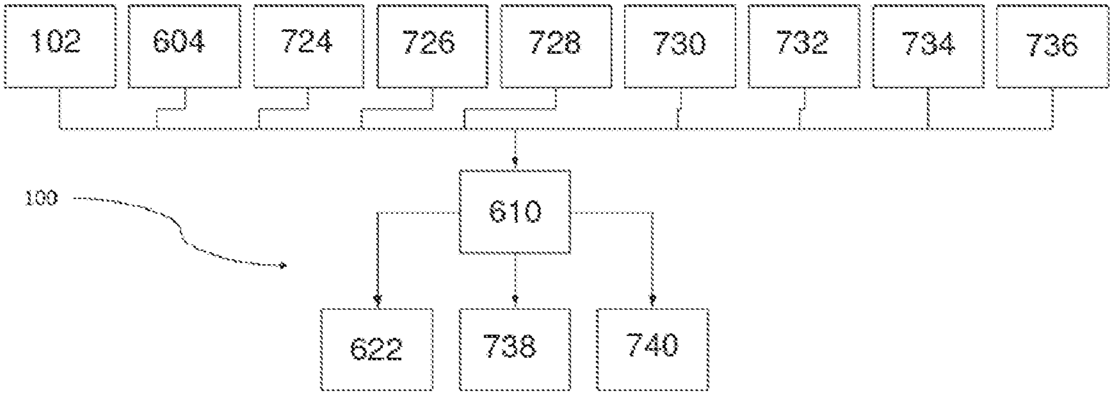
FIG. 7 is a flow diagram setting out the components of an ember detector device as herein disclosed and its relationship with an ember extinguishing system, a electroacoustic transducer, and a light source.
Figure 8:
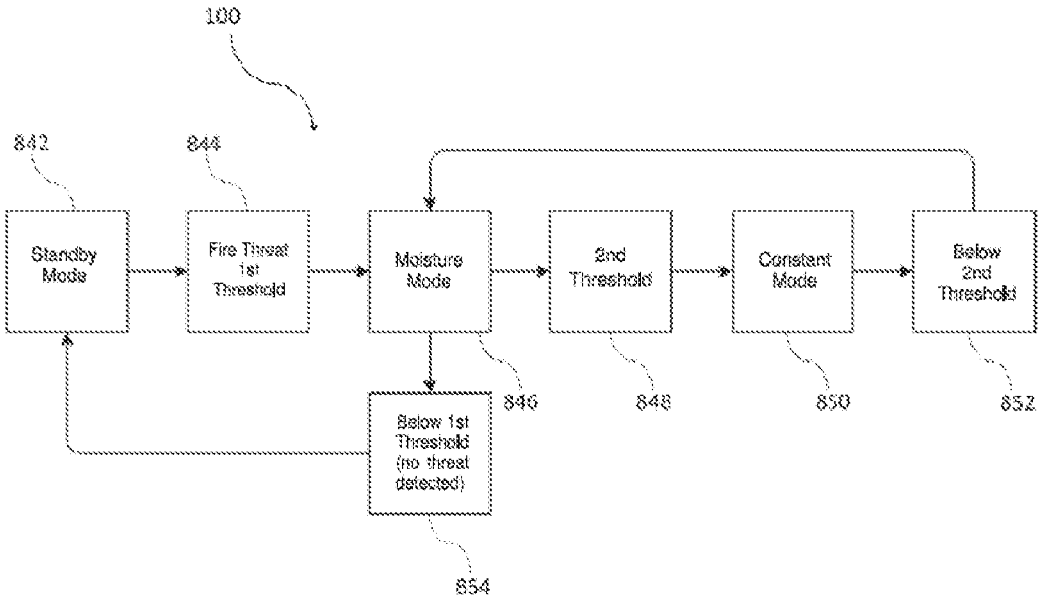
FIG. 8 is a flow diagram illustrating an operational process of the ember detector devices as shown in FIGS. 1, 2, and 6.

The ember detector device 100, and its operation, is schematically represented in FIGS. 6 to 8. The infrared sensor 102 and hygrometer 604 are in one-way electronic communication with the electronic controller 610. On actuation by receipt of appropriate infrared output and hygrometer output signals, the electronic controller 610 actuates an ember extinguishing system 622 to extinguish embers 320 that are falling in proximity to a building 316 as shown in FIGS. 4 and 5.

As shown in FIG. 6, the ember detection device 100 includes the infrared sensor 102 and hygrometer 604 in electronic communication with the electronic controller 610. In this embodiment, the electronic controller 610 is hard-wired to the ember extinguishing system 622. The relevant output signals generated by the infrared sensor 102 and hygrometer 604 are relayed to the electronic controller 610, which is configured to constantly monitor these output signals in a standby mode. If each relevant output signal reaches a pre-determined control point value, the electronic controller 610 actuates the ember extinguishing system 622. A person skilled in the art will appreciate that the ember detection device 100, electronic controller 610, and the ember extinguishing system 622 may communicate via a wireless network, a hard-wired network, or any combination of hard-wired and wireless networks. Such wireless network may be a local Wi-Fi network, a peer-to-peer communications network (e.g., Bluetooth or Wi-Fi Direct), or a mobile network such as used for mobile communications. The mobile network such as used for mobile communications may include any mobile wireless telecommunications technology such as, for example only, such technologies that comply with the standards of set by the International Telecommunications Union including, but not limited to, 3G, 4G, and/or 5G.

Wireless networking of the ember detection device 100, electronic controller 610, and the ember extinguishing system 622 may, in a preferred embodiment, enable remote monitoring and control via the internet.

Preferably, the ember extinguishing system 622 may be configured to use water and/or at least one flame-retardant compound to extinguish embers. In a preferred embodiment, the ember extinguishing system 622 may include a reticulated pipe system to convey water and/or at least one flame-retardant compound from an access/storage point to a point of need. In a preferred embodiment, the reticulated pipe system may include pipes composed of heat-resistant material.

It will be appreciated that sprinklers and/or nozzles may be included at various points along the reticulated pipe system to permit delivery of water and/or at least one flame-retardant compound generally around, for example, a protected building or directed to specific areas of need around the building. It will be further appreciated that the ember extinguishing system 622 may include one or more pump(s) to deliver the water and/or at least one flame-retardant compound as required. In a preferred embodiment, the pump may be an electrical pump. In a further preferred embodiment, the electrical pump may be a submersible electrical pump.

In yet further preferred embodiments, the delivery of water and/or at least one flame-retardant compound will coincide with ember detection and cease once any ember(s) have been extinguished. A person skilled in the art will appreciate that coincident delivery of water and/or at least one flame-retardant compound and ember detection will spare reserves of the water and/or at least one flame-retardant compound, particularly if such reserves have a limited volume.

In preferred embodiments, the water and/or at least one flame-retardant compound may be placed in inventory for use on demand. In still further preferred embodiments, the ember extinguishing system 622 may include at least one container for storing water and/or at least one flame-retardant compound in fluid communication with the reticulated pipe system. In preferred embodiments, such at least one container may be a tank, a cistern, an elevated tank, a subterranean tank, a portable tank, and the like. A person skilled in the art will appreciate that an elevated tank will provide a benefit of gravity-driven feed of water and/or at least one flame-retardant compound stored therein. A person skilled in the art will also appreciate that such gravity-driven feed of water and/or at least one flame-retardant compound may provide an alternative supply in the event of a pump failure.

In a particularly preferred embodiment, the ember detection device actuates the ember extinguishing system in response to a falling ember and then, once the ember is extinguished, turns off the ember extinguishing system and thereby saves the water and/or at least one flame-retardant compound.

Extinguishing of an ember and/or a fire will be understood to include forming a barrier between burning material included in the ember and/or a fire and any oxygen source. Alternatively, extinguishing of the ember and/or a fire will also be understood to include absorbance by the water and/or at least one flame-retardant compound of the heat generated by the ember and/or a fire. Further alternatively, extinguishing of the ember and/or a fire should also be understood to include absorbance by the water and/or at least one flame-retardant compound of the smoke gases generated by the ember and/or a fire.

A person skilled in the art will understand that the term “extinguishing”, and any derivatives of this term, as used herein should be understood to also include surface cooling of an ember or burning object (direct extinguishment), production of steam (indirect extinguishment), and gas cooling (also known as smoke cooling).

Extinction of the ember and/or a fire will be understood to have been reached when the ember and/or a fire ceases undergoing a combustion reaction as a result of the exclusion of one or more of the three elements of the fire-triangle known to persons skilled in the art, i.e., heat, fuel, and oxygen.

In practice, extinction of the ember and/or a fire will be understood to have been reached when the ember and/or a fire is no longer emitting sufficient heat to begin a or continue a combustion reaction.

Also in practice, extinction of the ember and/or a fire will be understood to have been reached when the ember detector device has detected that an ember or fire of interest is no longer resulting in generation of, for example only, an ember and/or fire detection alert signal based on directional absorptance, a directional attenuation coefficient, directional reflectance, directional transmittance, heat flux, a hemispherical attenuation coefficient, hemispherical emissivity, hemispherical reflectance, hemispherical transmittance, irradiance flux density, luminous flux, power, radiance, radiant energy, radiant energy intensity, radiant exitance, radiant exposure, radiant flux, radiant intensity, radiosity, spectral directional absorptance, a spectral directional attenuation coefficient, spectral directional reflectance, spectral directional transmittance, spectral exitance, spectral exposure, spectral flux, spectral flux density, a spectral hemispherical attenuation coefficient, spectral hemispherical emissivity, spectral hemispherical reflectance, spectral hemispherical transmittance, spectral intensity, spectral irradiance, spectral radiance, spectral radiosity, and/or any combination of the afore-mentioned indicative of an ongoing combustion reaction within material that composed an erstwhile ember and/or fire.

The ember and/or fire detection device may be configured to detect an ongoing combustion reaction in an ember and/or fire using empirical techniques known to a person skilled in the art. The empirical techniques may, for example only, include experimenting with watering time and/or at least one flame-retardant compound under pertinent conditions known to those skilled in the art.

A benefit of such a needs-based actuation of the ember detection system may be sparing of the environment as a result of a reduction in the use of any flame-retardant compound(s).

In a preferred embodiment, as shown in FIG. 7, the ember detection device 100 further includes a UV sensor 724, a thermometer 726, a barometer 728, a smoke detector 730, a carbon dioxide detector 732, an electronic positioning system 734, and a power supply indicator 736 in electronic communication with the electronic controller 610. The electronic controller 610 is in electronic communication with the ember extinguishing system 622, an electroacoustic transducer 738, and a light source 740. Each of the UV sensor 724, thermometer 726, barometer 728, smoke detector 730, carbon dioxide detector 732, electronic positioning system 734, and a power supply indicator 736 is configured to generate an appropriate output signal that is received by the electronic controller 610, which signals are compared to a relevant signal control point values, and provide an appropriate alert signal based on each comparison. In a preferred embodiment an appropriate alert signal may be sent by the electronic controller 610 to one or more designated monitoring devices, for example a pager and/or mobile device.

Preferably, the thermometer 726 may be a blackbody radiation thermometer, a density thermometer, a fluorescence thermometer, a magnetic susceptibility thermometer, a nuclear magnetic resonance thermometer, a pressure thermometer, a thermal expansion thermometer, a thermochromism thermometer, an electrical potential thermometer, an electrical resistance thermometer, an electrical resonance thermometer, or an optical absorbance thermometer.

In a preferred embodiment, the electronic positioning system 734 may be pre-programmed with a specific location, i.e., a specific position. In preferred embodiments, the electronic positioning system 734 may be configured to draw positioning data from a network that includes a global system, a grid system, a mobile telecommunication system, a regional system, a site-wide system, or a workspace system. In a preferred embodiment, the global system may be satellite-based navigation system. In a further preferred embodiment, the grid system may include a plurality of cells, each cell of the grid system allocated a unique identifier. In yet a further preferred embodiment, the regional system may be a network of land-based positioning transmitters.

In yet a further preferred embodiment, the ember detection device 100 may include a communication system (not shown) configured to relay data, for example locational, audio, video, sensor or any combination of locational, audio, video, or sensor data, to a command centre (not shown).

As shown in FIG. 7, the ember detector device 100 is configured to actuate an ember extinguishing system 622, an electroacoustic transducer 738, and a light source 740. Preferably, the electroacoustic transducer 738 generates an audible alarm and the light source generates a visible alarm in response to an ember detection alert generates by the ember detector device 100. A person skilled in the art will appreciate that the audible alarm may be a siren sound, a voice command, a voice providing evacuation directions, a voice command providing situation-appropriate information, and the like. A person skilled in the art will also appreciate that the visible alarm may be a visual cue, information relating to evacuation path(s), and the like.

As shown in FIG. 8, the ember detector device 100, when turned on and having detected no possible fire threats, i.e., no ember(s), will operate in Standby Mode 842. Standby Mode 842 is defined as a powered ember detector device 100 that is monitoring relevant sensor output signals from sensors such as the sensors shown in FIG. 7, i.e., the infrared sensor 102, hygrometer 604, UV sensor 724, thermometer 726, barometer 728, smoke detector 730, and carbon dioxide detector 732, but is taking no other action. When any one or more of these sensors generate(s) an output signal that reaches a Fire Threat 1$^{st}$ Threshold 844 of two pre-set thresholds 844, 848, the ember detector device 100 will activate. The ember detector device 100 will no longer be in Standby Mode 842 and will enter Moisture Mode 846. Moisture Mode 846 is defined as an intermittent mode that alternates the ember extinguishing system 622, as shown in FIGS. 6 and 7, between an ON and an OFF state. The operating parameters of Moisture Mode 846 are as follows: if any one or more output signal(s) of the infrared sensor 102, hygrometer 604, UV sensor 724, thermometer 726, barometer 728, smoke detector 730, and carbon dioxide detector 732, but in particular the infrared sensor 102 and UV sensor 724, is/are equal or greater than the Fire Threat 1$^{st}$ Threshold 844 but below the 2$^{nd}$ Threshold 848, the electronic controller (not shown in FIG. 8) will activate the ember extinguishing system (not shown in FIG. 8) for a set period of time. Such set period may be adjusted as appropriate in the circumstances and may be, for example, a period of 5 minutes. When the hygrometer 604, as shown in FIG. 7, output signal is equal to or less than a pre-determined control point, the ember extinguishing system 622, as shown in FIGS. 6 and 7, will be re-actuated for a set period as deemed appropriate in the circumstances, for example a period of 5 minutes. Alternating between Standby Mode 842 and Moisture Mode 846 may repeat depending on the output signals from the infrared sensor 102, hygrometer 604, UV sensor 724, thermometer 726, barometer 728, smoke detector 730, and carbon dioxide detector 732, but in particular the infrared sensor 102 and UV sensor 724 (as shown in FIG. 7). Should all such output signals return to Below Fire Threat 1$^{st}$ Threshold 854, the ember detector device 100 will revert to Standby Mode 842. On the other hand, if the output signals from the infrared sensor 102, hygrometer 604, UV sensor 724, thermometer 726, barometer 728, smoke detector 730, and carbon dioxide detector 732, but in particular the infrared sensor 102 and UV sensor 724, is/are equal to or greater than the 2$^{nd}$ Threshold 848, the ember detector device 100 will switch to Constant Mode 850. Constant Mode 850 will actuate the ember extinguishing system (as shown in FIGS. 6 and 7) until the output signals from the infrared sensor 102, hygrometer 604, UV sensor 724, thermometer 726, barometer 728, smoke detector 730, and carbon dioxide detector 732, but in particular the infrared sensor 102 and UV sensor 724, are below the 2$^{nd}$ Threshold 852, then the ember detection device 100 will revert to Moisture Mode 846 and the output signals from the infrared sensor 102, hygrometer 604, UV sensor 724, thermometer 726, barometer 728, smoke detector 730, and carbon dioxide detector 732, but in particular the infrared sensor 102 and UV sensor 724, will then become the primary activating trigger(s) again.

Preferred embodiments of the electronic controller 610 may be configured to include an algorithm that incorporates one or more BAL (Bushfire Attack Level) rating (or a regional/country specific equivalent) to determine a building and/or object's risk of catching fire.

BAL ratings are known to include BAL Low, BAL 12.5, BAL 19, BAL 29, BAL 40, and BAL FZ. For purposes of explanation only:

- BAL Low represents no significant risk of fire from embers, radiant heat, and/or flames.
- BAL 12.5 represents an ember risk, where there is sufficient risk of fire resulting from embers and/or burning debris with respect a specific building, a specific building element, and/or object.
- BAL 19 represents an increase in heat flux and a possibility of ignition of flammable material as a result of increased embers.
- BAL 29 represents a further increase in heat flux, a presence of burning material, and a risk to the integrity of a building and/or object.
- BAL 40 represents an increase in exposure to flames and includes the element of BAL 29.
- BAL FZ represents direct contact with flames and a direct threat to a building and/or an object including any occupant of the building, including an animal or a human.

In preferred embodiments, each building and/or object of interest is allocated an ember detector device 100 and an ember extinguishing system 622 specific to the building and/or object of interest. The ember detector device 100 specific to the building and/or object of interest will be configured to include its own custom time set for activation and duration of the ember extinguishing system 622. Alternatively, the ember detector device 100 specific to the building and/or object of interest may be configured to actuate a fire suppression system (not shown). In preferred embodiments, in the case of a fire or an escalating fire threat, the ember detector device 100 may be configured to receive data from sensors located proximal to the ember detector device 100, distal to the ember detector device 100, on an adjacent building and/or object, at a monitoring point proximal to the ember detector device 100, and/or a monitoring point distal to the ember detector device 100. The data may be received in an ongoing manner which facilitates a proportional adjustment of the timing of activation and duration of operation of the ember extinguishing system 622 and/or the fire suppression system, thereby, saving water and any fuel/power that may be required to maintain operation of the ember detector device 100 and the ember extinguishing system 622 and/or fire suppression system, with a consequential high level of building and/or object protection.

A bush/wild fire detection and threat management system (not shown) may include a preferred embodiment of the ember detector device 100, a preferred embodiment of the ember extinguishing system 622 as illustrated in FIGS. 1 to 8 as appropriate, and a fire suppression system (not shown). Operation of the bush/wild fire detection and threat management system may be linked to an escalation of a fire threat. Escalation of the fire threat and operation of the bush/wild fire detection and threat management system may include the following stages, for example only:

1. Low fire threat: ember extinguishing system 622 and/or the fire suppression system ON for a set duration.
2. Medium fire threat: ember extinguishing system 622 and/or the fire suppression system ON for a proportionally adjusted duration.
3. High fire threat: ember extinguishing system 622 and/or the fire suppression system ON continuously.
4. Return to low or medium fire threat as per 1 and 2 above.
5. Fire threat removed: ember extinguishing system 622 and/or the fire suppression system OFF.

Timing and activation of the bush/wild fire detection and threat management system may be configured to be proportional to the moisture levels of a building and/or object, level of UV radiation emitted from an ember and/or fire, temperature of a building and/or an object, and/or ambient temperature resulting from a fire. Ambient temperature will be understood to include air temperature as a result of a fire.

Timing and duration of operation of the bush/wild fire detection and threat management system may be configured to be proportional to the proximal and/or distal topography, building and/or object location, and/or proximal and/or distal fuel load relative to a building and/or object of interest.

Timing, activation, and duration of operation of the bush/wild fire detection and threat management system may be configured to be proportional to the ambient temperature, temperature of a building and/or object of interest, ambient humidity, moisture content of the building and/or object of interest, wind speed proximal to the building and/or object of interest, wind speed distal to the building and/or object of interest, rate of fire spread proximal to the building and/or object of interest, rate of fire spread distal to the building and/or object of interest, data received from sensors located proximal to the ember detector device 100, data received from sensors located distal to the ember detector device 100, data received from sensors located on an adjacent building and/or object, data received from sensors located at a monitoring point proximal to the ember detector device 100, and/or data received from sensors located at a monitoring point distal to the ember detector device 100 in a networked ember and/or fire detector system.

A networked bush/wild fire detection and threat management system may be configured to communicate via a wireless network, a hard-wired network, or any combination of hard-wired and wireless networks. The wireless network may be a local Wi-Fi network, a peer-to-peer communications network (e.g., Bluetooth or Wi-Fi Direct), or a mobile network such as used for mobile communications. The mobile network may be such as that used for mobile communications may include any mobile wireless telecommunications technology such as, for example only, such technologies that comply with the standards of set by the International Telecommunications Union including, but not limited to, 3G, 4G, and/or 5G.

A person skilled in the art will appreciate that the ember detector device and/or bush/wild fire detection and threat management system disclosed herein may be mounted to a building, a tower, a pole, or suspended adjacent any combustible material. Such building may include a dwelling, a manufacturing plant, a place of business, or a building in or proximal to an area such as a park, a field, an orchard, and/or a forest.

It will also be appreciated that where the ember detection device and/or bush/wild fire detection and threat management system as herein disclosed may be mounted proximal to a combustible material, for example a building, and where the ember detection device may be configured to actuate an ember extinguishing system that protects the building, the combination of the ember detection device and the ember extinguishing system will reduce a need to monitor the building during heightened fire alert periods. It will be further appreciated that fire authorities typically prioritise their efforts in the following order: saving human life, protecting buildings/property, and fighting environmental fires. Accordingly, where the ember detection device and/or bush/wild fire detection and threat management system as herein disclosed is used to protect flammable materials, for example buildings/property, the risk of such buildings/property catching fire is reduced, thereby reducing a potential increase in greenhouse gasses emission concomitant to burning of the buildings/property, and any subsequent increase in carbon footprint necessitated by required removal of consequential building ruins, and any rebuilding. In effect, buildings and/or property protected by the ember detection device as herein disclosed do not necessarily require direct protection from fire fighters, who can then concentrate on extinguishing a broader environmental fire, i.e., bushfire/wildfire, sooner, thus potentially reducing the number of buildings, properties, and environment from the threat of catching fire due to environmental fires. The overall effect is compounding the reduction of the destructive impact from an environmental fire. This reduction compounds as more fire is extinguished. Effectively, the fire authorities will be able to focus their efforts where needed, for example at a bushfire front. In effect, the ember detector device in combination with the ember extinguishing system as herein disclosed may also suppress the overall impact of fire damage that may arise due to embers falling on, for example, a building.

It will be further appreciated that the sooner the existing environmental fire is brought under control, the fewer animal and human lives, as well as less property, will be at risk.

It will also be appreciated that the ember detection device and/or bush/wild fire detection and threat management system as herein disclosed may be automated and thereby release people from having to monitor the afore-mentioned manually, i.e., in person as required by some known systems. As such, the people may then evacuate in a timely manner and be safely remote to any risk due to, for example, bushfires.

Having described preferred embodiments of the ember detector device 100 and bush/wild fire detection and threat management system, a preferred method of reducing greenhouse gasses will now be described, with reference to FIGS. 1 to 8, as relevant. Preferably, the ember detecting device 100 and/or bush/wild fire detection and threat management system is located proximal to a combustible material, for example a building 316. The ember detecting device 100 and/or bush/wild fire detection and threat management system includes an infrared sensor 102, a hygrometer 604, a 360° cone mirror 106, a lens 208, and an electronic controller 610. The infrared sensor 102 detects a reflected infrared photon and to generate an infrared sensor output signal. The hygrometer 604 detects ambient humidity and generates a hygrometer output signal. The 360° cone mirror reflects an incident infrared photon 212 as the reflected infrared photon 214. The lens 208 focuses the reflected infrared photon 214 onto the infrared sensor 102. The electronic controller 610 receives the infrared sensor output signal and the hygrometer output signal, compares the infrared sensor output signal with a predetermined infrared sensor output signal control point value, compares the hygrometer output signal with a predetermined hygrometer output signal control point value, and provides an ember detection alert signal based on each comparison.

It will be appreciated that the ember detecting device 100 and/or bush/wild fire detection and threat management system used in the present method may also include a UV sensor 724, thermometer 726, barometer 728, smoke detector 730, and carbon dioxide detector 732, as shown in FIG. 7.

A preferred method of reducing the risk associated with an ember attack and/or a fire will now be described, with reference to FIGS. 1 to 8, as relevant. Preferably, the ember detecting device 100 and/or bush/wild fire detection and threat management system is located proximal to a combustible material, for example a building 316. The ember detecting device 100 and/or bush/wild fire detection and threat management system includes an infrared sensor 102, a hygrometer 604, a 360° cone mirror 106, a lens 208, and an electronic controller 610. The infrared sensor 102 detects a reflected infrared photon and to generate an infrared sensor output signal. The hygrometer 604 detects ambient humidity and generates a hygrometer output signal. The 360° cone mirror reflects an incident infrared photon 212 as the reflected infrared photon 214. The lens 208 focuses the reflected infrared photon 214 onto the infrared sensor 102. The electronic controller 610 receives the infrared sensor output signal and the hygrometer output signal, compares the infrared sensor output signal with a predetermined infrared sensor output signal control point value, compares the hygrometer output signal with a predetermined hygrometer output signal control point value, and provides an ember detection and/or fire alert signal based on each comparison.

A preferred method of enhancing an ability to effectively fight an ember attack and/or a fire will now be described, with reference to FIGS. 1 to 8, as relevant. Preferably, the ember detecting device 100 and/or bush/wild fire detection and threat management system is located proximal to a combustible material, for example a building 316. The ember detecting device 100 and/or bush/wild fire detection and threat management system includes an infrared sensor 102, a hygrometer 604, a 360° cone mirror 106, a lens 208, and an electronic controller 610. The infrared sensor 102 detects a reflected infrared photon and to generate an infrared sensor output signal. The hygrometer 604 detects ambient humidity and generates a hygrometer output signal. The 360° cone mirror reflects an incident infrared photon 212 as the reflected infrared photon 214. The lens 208 focuses the reflected infrared photon 214 onto the infrared sensor 102. The electronic controller 610 receives the infrared sensor output signal and the hygrometer output signal, compares the infrared sensor output signal with a predetermined infrared sensor output signal control point value, compares the hygrometer output signal with a predetermined hygrometer output signal control point value, and provides an ember detection and/or fire alert signal based on each comparison.

The hygrometer may alternatively or additionally detect moisture content of a building and/or object of interest.

It will be appreciated by a person skilled in the art that the present method of reducing greenhouse gasses may be used to reduce carbon emissions that form part of greenhouse gasses. A person skilled in the art will appreciate that carbon emission may arise due to an ember causing a fire. Such a fire may be any environmental fire, such as a bush fire, a grassland fire, a forest fire, and/or a fire associated with a building and/or property. A person skilled in the art will further appreciate that the method may form part of a community outreach program, which may encourage users of the ember detector device to employ the ember detector device in an effort to spare animal and human lives and to protect a building from ember fall, in addition to reducing greenhouse gasses and carbon emission.

Any references to “top”, “bottom”, “left”, and “right” are for illustrative convenience only as would be appreciated by a person skilled in the art.

The features described with respect to one embodiment may be applied to other embodiments, or combined with, or interchanged with, the features of other embodiments without departing from the scope of the present invention.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method of detecting embers and or fires created from embers and activating a fire suppression system, comprising:

locating an ember fire detector device, proximal to a combustible material, the ember fire detector device including:

an ultra violet (UV) sensor configured to detect a level of UV radiation emitted from fires and to generate a UV sensor output signal; and an electronic controller configured to:

receive the UV sensor output signal; and compare the UV sensor output signal with a predetermined UV sensor output signal control point value;

providing fire detection alert signal based on the comparison;

determining a fire threat level based on the comparison of the UV values; and activating the fire suppression system if the fire threat level exceeds a predetermined value, wherein the fire suppression system is either proportionally adjusted or operated continuously, depending upon the fire threat level determined.

2. The method of claim 1, wherein the fire suppression system is operated continuously, based upon the fire threat level determined.

3. The method of claim 1, wherein the fire suppression system is operated for a proportionally adjusted duration, based upon the fire threat level determined.

4. A method of detecting embers and or fires created from embers and activating a fire suppression system, comprising:
- locating an ember fire detector device, proximal to a combustible material, the ember fire detector device including:
  - an ultra violet (UV) sensor configured to detect a level of UV radiation emitted from fires and to generate a UV sensor output signal; and
  - an electronic controller configured to:
  - receive the UV sensor output signal; and
  - compare the UV sensor output signal with a predetermined UV sensor output signal control point value;
- providing fire detection alert signal based on the comparison;
- determining a fire threat level based on the comparison of the UV values;
- activating the fire suppression system if the fire threat level exceeds a predetermined value; and
- deactivating the fire suppression system once the fire threat level indicates that the fire threat is removed.

5. The method of claim 1, further comprising using a 360° cone mirror configured to reflect an incident infrared photon as the reflected infrared photon to detect an ember.

6. A system for detecting embers or fires created from embers, and activating a fire suppression system, comprising:
- an ultra violet (UV) sensor configured to detect a level of UV radiation emitted from a fire, and being configured to generate a UV sensor output signal; and
- an electronic controller with a processor configured to:
  - receive the UV sensor output signal;
  - compare the UV sensor output signal with a predetermined UV sensor output signal control point value;
  - provide a fire detection alert signal based on the comparison;
  - determine a fire threat level based on the comparison of the UV values;
  - activate the fire suppression system if the fire threat level exceeds a predetermined value; and
  - proportionally adjust or continuously operate the fire suppression system depending upon the fire threat level determined.

7. The system of claim 6, further comprising a thermometer configured to detect an ambient temperature and to generate a thermometer output signal.

8. The system of claim 7, wherein the thermometer includes a blackbody radiation thermometer, a density thermometer, a fluorescence thermometer, a magnetic susceptibility thermometer, a nuclear magnetic resonance thermometer, a pressure thermometer, a thermal expansion thermometer, a thermochromism thermometer, an electrical potential thermometer, an electrical resistance thermometer, an electrical resonance thermometer, or an optical absorbance thermometer.

9. The system of claim 7, wherein the electronic controller is configured to:
- receive the thermometer output signal;
- compare the thermometer output signal with a predetermined thermometer output signal control point value; and
- provide a temperature alert signal based on the comparison.

10. The system of claim 6, further comprising a smoke detector configured to detect ambient smoke and to generate a smoke detector output signal.

11. The system of claim 10, wherein the smoke detector includes a combined photoelectric and ionization smoke detector, a photoelectric smoke detector, or an ionization smoke detector.

12. The system of claim 10, wherein the electronic controller is configured to:
- receive the smoke detector output signal;
- compare the smoke detector output signal with a predetermined smoke detector output signal control point value; and
- provide a smoke detection alert signal based on the comparison.

13. The system of claim 6, further comprising a carbon dioxide detector configured to detect ambient carbon dioxide and to generate a carbon dioxide detector output signal.

14. The system of claim 13, wherein the electronic controller is configured to:
- receive the carbon dioxide detector output signal;
- compare the carbon dioxide detector output signal with a predetermined carbon dioxide detector output signal control point value; and
- provide a carbon dioxide alert signal based on the comparison.

15. The system of claim 6, further comprising an electroacoustic transducer configured to produce an audible alarm in response to the ember or fire detection alert signal.

* * * * *